United States Patent

Usami

[11] Patent Number: 6,057,651
[45] Date of Patent: May 2, 2000

[54] LIGHTING APPARATUS

[75] Inventor: Yutaka Usami, Shizuoka-ken, Japan

[73] Assignee: Kabushiki Kaisha TEC, Shizouka, Japan

[21] Appl. No.: 09/138,778

[22] Filed: Aug. 24, 1998

[30] Foreign Application Priority Data

Aug. 26, 1997 [JP] Japan ................................. 9-229568

[51] Int. Cl.[7] .................................................. G05F 1/00
[52] U.S. Cl. .................... 315/291; 315/307; 315/209 R; 323/211
[58] Field of Search ................................. 315/291, 308, 315/307, DIG. 4, 247, 209 R; 323/211

[56] References Cited

U.S. PATENT DOCUMENTS

| 5,008,599 | 4/1991 | Counts | 315/247 |
| 5,394,064 | 2/1995 | Ranganath et al. | 315/209 R |
| 5,479,336 | 12/1995 | Motoki et al. | 363/89 |
| 5,532,918 | 7/1996 | Mayrand et al. | 363/89 |
| 5,612,609 | 3/1997 | Choi | 323/210 |
| 5,644,214 | 7/1997 | Lee | 323/211 |
| 5,661,645 | 8/1997 | Hochstein | 363/89 |
| 5,872,430 | 2/1999 | Konopka | 315/219 |

FOREIGN PATENT DOCUMENTS 9-74224  3/1997  Japan .

Primary Examiner—Haissa Philogene
Assistant Examiner—Tuyet Thi Vo
Attorney, Agent, or Firm—Frishauf, Holtz, Goodman, Langer & Chick, P.C.

[57] ABSTRACT

A lighting apparatus includes a full-wave rectifier circuit for rectifying an AC voltage from a commercial power source, a smoothing condenser connected is series with an inductor and a diode between output terminals of the full-wave rectifier circuit, a light source unit containing a series circuit of light emitting diodes and connected in parallel with the smoothing condenser, a MOSFET connected in series with the inductor between the output terminals of the full-wave rectifier circuit, and a control circuit for performing switching control of the MOSFET. In particular, the control circuit is constituted such that a voltage across the smoothing condenser is set higher than a peak of an input voltage input to the smoothing condenser through the diode and equal to a total sum of forward voltage drops of the light emitting diodes at a time of igniting the light source, under the switching control.

3 Claims, 3 Drawing Sheets

LIGHTING APPARATUS

BACKGROUND OF THE INVENTION

The present invention relates to a lighting apparatus whose light source is made up of light emitting diodes.

In a conventional fluorescent lighting apparatus, as shown in FIG. 7, an alternating current (AC) voltage from a commercial power source 1 is converted into a direct current (DC) voltage by a diode bridge full-wave rectifier circuit 2, and the DC voltage is boosted by a booster circuit 3 and is supplied to a high-frequency inverter circuit 4. The high-frequency inverter circuit 4 converts the output voltage of the booster circuit 3 into a high-frequency voltage and applies the voltage to a fluorescent lamp serving as the light source.

In the booster circuit 3, a condenser 6 is connected between output terminals of the full-wave rectifier circuit 2, and a switch element 8 formed of a transistor or the like is connected in series with an inductor 8 between the output terminals of the full-wave rectifier circuit 2. Further, a series of a diode 9 and a smoothing condenser 10 of a large capacity is connected in parallel with the switch element 8 through a diode. The switch element 8 is turned on and off by a control circuit 11.

The inverter circuit 4 is a half bridge inverter in which a series circuit of switch elements 12 and 13 such as transistors or the like is connected between both ends of the smoothing condenser 10, a series circuit of condensers 14 and 15 is connected in parallel with the series circuit of switch elements 12 and 13, and a fluorescent lamp 5 is connected in series with a choke coil 16 between a junction between the switch elements 12 and 13 and a junction between the condensers 14 and 15. A pre-heating condenser 17 is connected between filament electrodes of the fluorescent lamp 5.

In the booster circuit 3, when the switch element 8 is turned on by the control circuit 11, a current flows into an inductor 7 and is stored therein as magnetic energy. Then, the switch element 8 is turned off by the control circuit 11. At this time, a current flows from the inductor 7 through the diode 9 to the smoothing condenser 10. This operation causes the magnetic energy stored in the inductor 7 to be converted into electrostatic energy and stored in the smoothing condenser 10. The smooth condenser 10 performs a smoothing in which the DC voltage supplied from the rectifier circuit 2 rendered substantially flat by absorbing a ripple component having a commercial frequency of 50 Hz.

In the inverter circuit 4, a rectangular waveform voltage is generated at the junction between the switch elements 12 and 13 by alternately turning on and off the switch elements 12 and 13, so that a pre-heating current initially flows to the filament electrodes of the fluorescent lamp 5 through the pre-heating condenser 17 and then the fluorescent lamp 5 starts lighting by a high voltage applied between the filament electrodes.

In this lighting apparatus, the high-frequency inverter circuit 4 is used to prevent flickering of the fluorescent lamp 5, and the booster circuit 3 is used to drive the inverter circuit 4. In addition, use of an alternating current prevents mercuric vapor from being displaced on one electrode side in the fluorescent lamp 5.

In a conventional light emitting diode lighting apparatus, as shown in FIG. 8, an AC voltage of the commercial power source 21 is converted into a DC voltage by a diode bridge full-wave rectifier circuit 22, and is smoothing by a smooth condenser 23. In addition, diode units are connected in series with respective current limiting resistors 24 between both ends of the smoothing condenser 23. Each diode unit is constituted by a plurality of light emitting diodes 25 which are connected in series with each other to form a light source.

Each current limiting resistor 24 limits a current flowing through a corresponding diode unit to a constant value, thereby causing the light emitting diodes 25 of the corresponding diode unit to light.

The conventional fluorescent lighting apparatus has the following problems. The number of circuit components is increased since the high-frequency inverter circuit and the booster circuit are required in order to convert an AC voltage of the commercial power source into a high-frequency voltage. The power loss is enlarged since electric power conversion such as the AC to DC voltage conversion and the DC to high-frequency voltage conversion is carried out for two times.

On the other hand, the conventional diode lighting apparatus has a problem that the power conversion efficiency is deteriorated by power loss at the current limiting resistors disposed in the current paths to the light emitting diodes. Hence, it can be considered that current limiting reactors are used instead of the current limiting resistors. However, since the current limiting reactors must have an inductance of about 100 mH to act on a commercial frequency of 50 Hz and are of a large size and a heavy weight, they are not suitable for practical use. Further, since a smoothing of a condenser-input type is performed on the commercial AC power source, there is a problem that the circuit components are adversely affected by harmonic components produced due to stationary periods present in the waveform of the input current.

BRIEF SUMMARY OF THE INVENTION

The present invention has an object of providing a lighting apparatus capable of reducing power loss and harmonic components without necessitating a complicated structure.

According to a first aspect of the present invention, a lighting apparatus comprises a full-wave rectifier circuit electrically connected to an AC power source; a switch element connected in series with an inductor between output terminals of the full-wave rectifier circuit; a smoothing condenser connected in parallel to the switch element through a diode connected in series with the smoothing condenser; a light source unit connected in parallel with the smoothing condenser and including at least one series circuit of light emitting diodes connected such that a current flowing therethrough is not limited; and a control circuit which controls the switch element. The control circuit includes a setting section for setting a threshold voltage, a current detecting port connected to detect a current flowing through the switch element, an input voltage detecting port connected to detect an input voltage to the smoothing condenser, and a condenser voltage detecting port connected to detect a voltage across the smoothing condenser. The control circuit is arranged such that the threshold voltage is variably set in proportion to the input voltage from the input voltage detecting port and is also variably set according to a difference obtained by comparing a reference voltage with the voltage from the condenser voltage detecting port to have a waveform similar to that of the input voltage, and such that the switch element is turned on to store a magnetic energy in the inductor and is turned off on the basis of a relationship between the threshold voltage and a detection voltage from the current detection port to supply a current and store electric energy in the smoothing condenser. A timing of turning on the switch element is determined on the basis of a decrease in the magnetic energy in the inductor, and such that the voltage across the smoothing condenser is set higher than a peak of the input voltage to the smoothing condenser and equal to a total sum of forward voltage drops of the light emitting diodes at a time of igniting of the light source unit.

According to a second aspect of the present invention, the control circuit sets the voltage across the smoothing condenser to a voltage lower than a total sum of minimum forward voltage drops of the series-connected light emitting diodes at a time of extinguishing of said light source unit.

According to another aspect of the present invention, the control circuit sets the voltage across the smoothing condenser to a voltage higher than a total sum of minimum forward voltage drops of the series-connected light emitting diodes and lower than a total sum of maximum forward voltage drops of the series-connected light emitting diodes at a time of adjusting of brightness of the light source unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A light emitting diode lighting apparatus according to an embodiment of the present invention will be explained with reference to the drawings.

Figure 1:
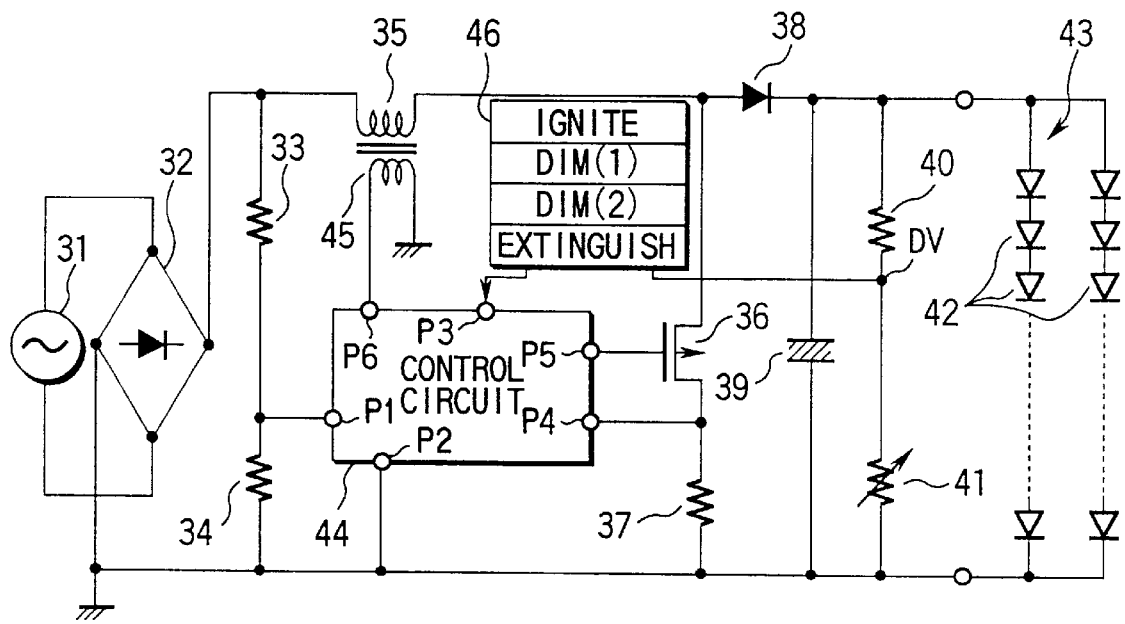
FIG. 1 is a circuit diagram showing the structure of a light emitting diode lighting apparatus according to an embodiment of the present invention.
Figure 2:
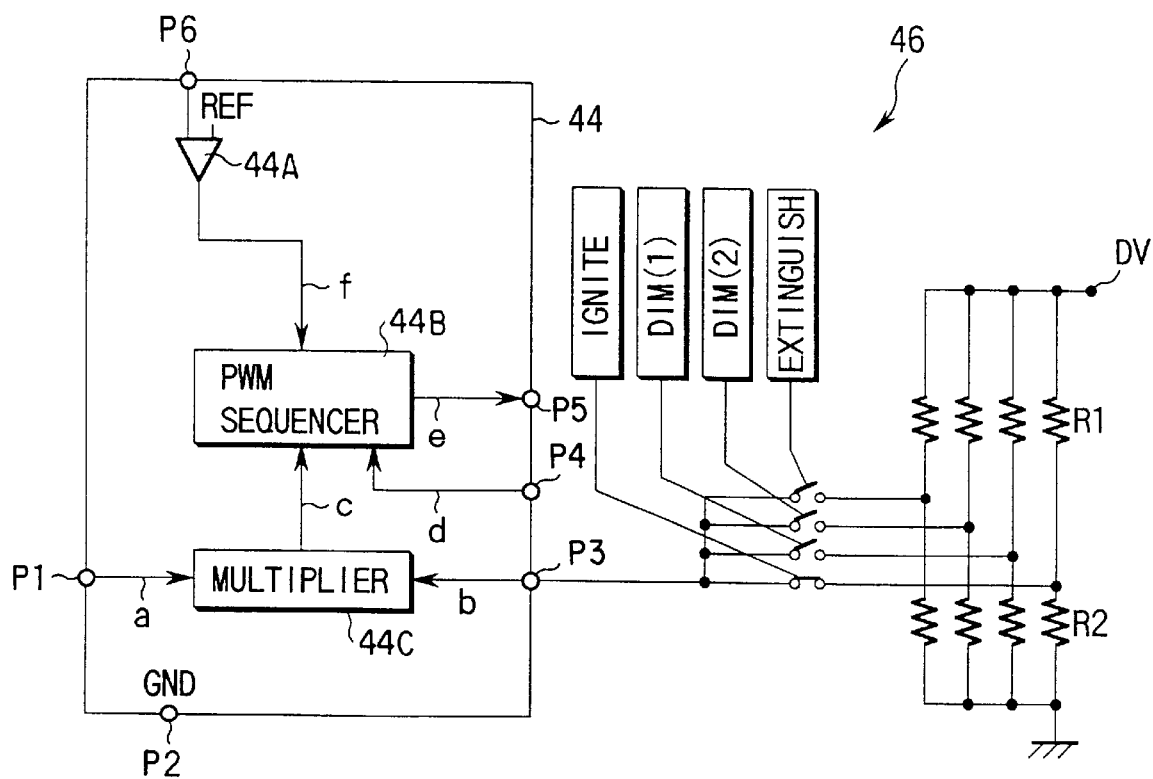
FIG. 2 is a circuit diagram specifically showing a control circuit shown in FIG. 1.

FIG. 1 shows the structure of the light emitting diode lighting apparatus. The lighting apparatus includes a diode bridge full-wave rectifier circuit 32, resisters 33, 34, 37, and 40, a choke coil 35, a MOS field effect transistor (MOSFET) 36, a diode 38, a smoothing condenser 39, a variable resistor 41, a control circuit 44, and a light source unit 43.

An input terminal of the diode bridge full-wave rectifier circuit 32 is connected to receive an AC voltage from a commercial AC power source 31. A series circuit of the resistors 33 and 34 is connected as a voltage divider between output terminals of the full-wave rectifier circuit 32. A negative polarity output terminal of the full-wave rectifier circuit 32 is grounded.

The MOSFET 36 is used as a switch element and the choke coil 35 is used as an inductor. A series circuit of the MOSFET 36 and the resistor 37 is connected in series with the choke coil 35 between the output terminals of the full-wave rectifier circuit 32. Further, the smoothing condenser 39 is connected in series with the choke coil 35 and the diode 38 between the output terminals of the full-wave rectifier circuit 32. A series circuit of the resistor 40 and the variable resistor 41 is connected in parallel with the smoothing condenser 39. Further, the light source unit 43 is connected in parallel with the smoothing condenser 39. The light source unit 43 includes first and second series circuits connected in parallel and each containing a plurality of light emitting diodes 42 connected in series with each other to form a light source.

The control circuit 44 is provided as an integrated circuit chip which performs a switching control of the MOSFET 36. The control circuit 44 includes an input voltage detection terminal P1 connected to a junction between the resistors 33 and 34, a ground terminal P2 grounded, a voltage feedback terminal P3 connected to receive a voltage fed back from a junction DV between the resistor 40 and the variable resistor 41, a current peak detection terminal P4 connected to a junction between a source electrode of the MOSFET 36 and the resistor 37, a control output terminal P5 connected to a gate electrode of the MOSFET 36, and a current stop detection terminal P6 connected to an end of a coil 45 magnetically coupled with the choke coil 35. The other end of the coil 45 is grounded. This lighting apparatus further comprises an operation unit 46 including an ignite button, a dim (1) button, a dim (2) button, and an extinguish button. The operation unit 46 is constituted such that a voltage obtained from the junction DV is divided according to a selected one of the buttons and supplied to the voltage feedback terminal P3 of the control circuit 44.

The control circuit 44 includes a comparator 44A, a PWM sequencer 44B, and a multiplier 44C. The comparator 44A compares a current flowing through the current stop detection terminal P6 with a reference value REF, and supplies an output voltage f corresponding to the comparison result, to the PWM sequencer 44B. When the current is smaller than the reference value REF, the output voltage f is set to 0 V. The multiplier 44C multiplies an input voltage a from the input voltage detection terminal P1 by a feedback voltage b from the voltage feedback terminal P3, and supplies a voltage c as the multiplication result to the PWM sequencer 44B. The current peak detection terminal P4 further supplies an output voltage d from the MOSFET 36 to the PWM sequencer 44B to detect a current peak. The PWM sequencer 44B supplies a turn-on voltage as a control voltage to the MOSFET 36 through the control output terminal P5 when the output voltage f is 0 V, and a turn-off voltage as the control voltage to the MOSFET 36 through the control output terminal P5 when the output voltage d is equal to the voltage c from the multiplier 44c. To maintain the voltage of the junction DV at a constant value, the operation unit 46 is constituted such that the voltage is divided by a voltage divider formed of resistors R1 and R2 provided for each button and negatively fed back to the voltage feedback terminal P3. The division ratio of the voltage divider for the ignite button is determined to be, for example, 100:1 by the resistance ratio R1:R2 between the resistors R1 and R2. In this condition, if the system is constructed so as to ignite all the light emitting diodes 42 of the light source unit 43, the division ratio of the voltage divider circuit for the dim (1) button is determined to be, for example, 100:5 by the resistance ratio R1:R2. The division ratio of the voltage divider for the dim (2) button is determined to be, for example, 100:10 by the resistance ratio R1:R2. The division ratio of the voltage divider for the extinguish button is determined to be, for example, 100:30 by the resistance ratio R1:R2.

An operation of the light-emitting diode lighting apparatus will be explained below.

When the MOSFET 36 is turned on, a current flows through the choke coil 35, the MOSFET 36, and the resistor 37, and the choke coil 35 stores a magnetic energy corresponding to the current flowing therein. Then, the MOSFET 36 is turned off. At this time, the current flowing through the MOSFET 36 is shut off, and a current flows from the choke coil 35 through the diode 38 to the smoothing condenser 39. Charges are thereby stored in the smoothing condenser 39, and the magnetic energy in the choke coil 35 is decreased.

At the timing when the current flowing in the choke coil 35 is reduced to zero, the MOSFET 36 is turned on again. Thereafter, the operation described above is repeated. To reduce the current flowing in the choke coil 35 to zero, the voltage across the smoothing condenser 39 must be higher than the peak of the input voltage. Thus, the AC to DC conversion of a boosting type is required.

Since charging of the smoothing condenser 39 depends on the switching state of the MOSFET 36, a current is kept flowing into the smoothing condenser 39 by continuously turning on and off the MOSFET 36 although depending on the input voltage.

Figure 3:
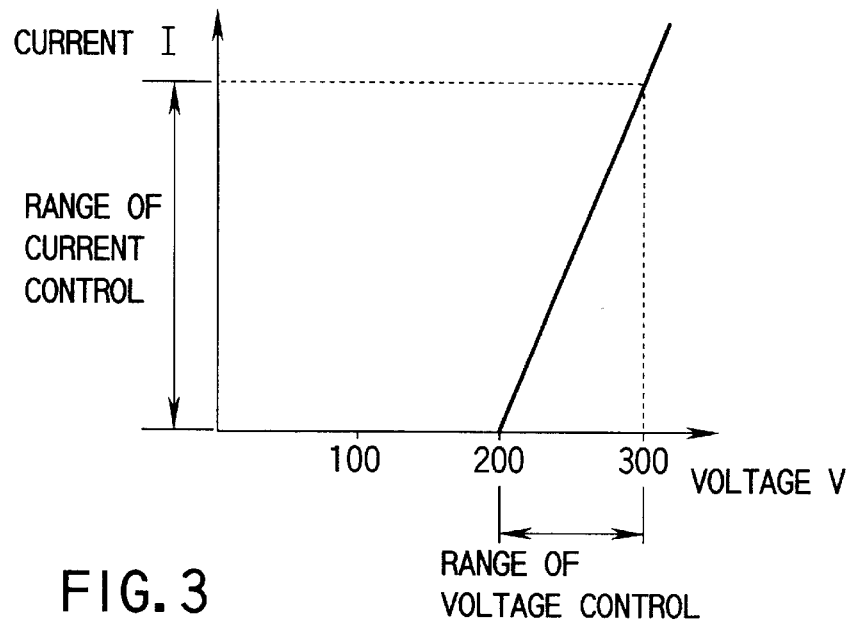
FIG. 3 is a graph showing a relationship between a voltage control range and a current control range of a light source unit shown in FIG. 1.

In a case where two hundred light emitting diodes are connected in series, the total sum of the forward voltage drops of the light emitting diodes 42 falls within a range of 200 V to 300 V, assuming that the minimum forward voltage drop of the light emitting diode 42 is 1 V, and the maximum forward voltage drop thereof is 1.5 V at a current flow of 200 mA. Accordingly, no current flows through the light emitting diodes 42 at all when the voltage across the smoothing condenser 39 is 0 to 200 V. When the voltage across the smoothing condenser 39 is 200 V to 300 V, the amount of current flowing through the light emitting diodes 42 is determined by the voltage to vary the light emitting amount of the light emitting diodes 42 with the voltage. When the voltage is 300 V, the light source 43 becomes to a state where the maximum brightness can be obtained. At this time, the relationship between the voltage and the current is expressed in the graph in FIG. 3.

The voltage across the smoothing condenser 39 is raised by extending the on-period of the MOSFET 36 since the magnetic energy stored in the choke coil 35 is increased according to the extension, and as a result the amount of the energy converted into a charge energy into the smoothing condenser 39 is also increased. Inversely, the voltage across the smoothing condenser 39 is reduced by shortening the on-period of the MOSFET 36. In this manner, the voltage applied to the light source unit 43 can be changed within a range of 200 V to 300 V to perform a control of adjusting the brightness of the light source unit 43.

Therefore, when the ignite button of the operation unit 4E is operated, the control circuit 44 controls the MOSFET 36 to be turned on and off such that the voltage across the smoothing condenser 39 becomes 300 V. When the dim (1) button of the operation unit 46 is operated, the MOSFET 36 is controlled to be turned on and off such that the voltage across the smoothing condenser 39 becomes, for example, 270 V. When the dim (2) button of the operation unit 46 is operated, the MOSFET 36 is controlled to be turned on and off such that the voltage across the smoothing condenser 39 becomes, for example, 230 V. When the extinguish button of the operation unit 46 is operated, the MOSFET 36 is controlled to be turned on and off such that the voltage across the smoothing condenser 39 becomes lower than 200 V or to be kept off. With the control described above, the light source unit 43 is lit with the maximum brightness when the ignite button is operated. When the dim (1) button is operated, the light source unit 43 is lit with the brightness of about 70%. When the dim (2) button is operated, the light source unit 43 is lit with the brightness of about 30%. The light source unit 43 is extinguished when the extinguish button is operated. As a result, extinguishing control, brightness adjusting control, and igniting control can be achieved without necessitating a complicated structure.

Figure 4:
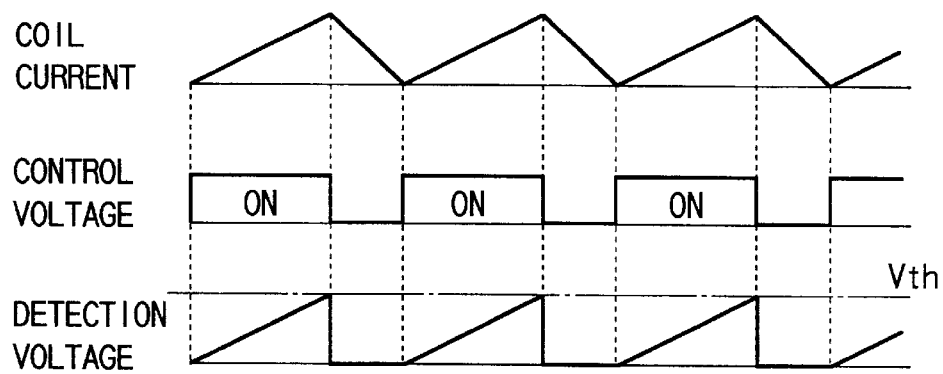
FIG. 4 is a time chart showing a current flowing in a choke coil, a control voltage supplied to a MOSFET, and an output detection voltage obtained from the MOSFET in FIG. 1.

The control circuit 44 detects the condition of the input voltage, the voltage across the smoothing condenser 39, the change point of the current flowing in the choke coil 35, and the current flowing in the MOSFET 36 in order to perform a control of switching the MOSFET 36 at predetermined timings upon operations of the ignite button, the dim (1) button, the dim (2) button, and the extinguish button. The condition of the input voltage is detected from the voltage at the junction between the resistors 33 and 34. The voltage across the smoothing condenser 39 is detected from the voltage at the junction between the resistor 40 and the variable resistor 41. The change point of the current flowing in the choke coil 35 is detected from the current flowing through the coil 45 magnetically connected with the choke coil 35 and picked up from the terminal P6. The current flowing through the MOSFET 36 is detected from the voltage at the junction between the MOSFET 36 and the resistor 37 and inputted to the terminal P4. Further, based on the detection results, the control circuit 44 outputs a signal to the terminal P5 for controlling the MOSFET 36 to be turned on and off at the predetermined timings. Specifically, when the MOSFET 36 is turned on as shown in FIG. 4, the current flowing in the choke coil 35 increases linearly as shown in FIG. 4. Since this current flows through the MOSFET 36 and the resistor 37, the voltage waveform obtained at the resistor 37 becomes as shown in FIG. 4. Accordingly, the control circuit 44 detects the waveform of the voltage inputted to the terminal P4 to turn off the MOSFET 36 when it is detected that the voltage reaches a threshold voltage Vth.

When the MOSFET 36 is turned off, the current flowing in the choke coil linearly decreases as shown in FIG. 4 and finally becomes zero. Then, the control circuit 44 detects the timing at which the current become zero, from an input to the terminal P6 to turn on the MOSFET 36.

In this control, therefore, the timings at which the MOSFET 36 is controlled to be turned on and off can be changed by variably setting the threshold voltage Vth in the control circuit 44. Specifically, if the threshold voltage Vth is increased, the input current is increased and the amount of current flowing into the smoothing condenser 39 is also increased. Inversely, if the threshold voltage Vth is decreased, the input current is decreased and the amount of current flowing into the smoothing condenser 39 is also decreased.

Accordingly, the rate of brightness can be adjusted by the threshold voltage Vth to be set. Further, the threshold voltage Vth is set to cope with a change in the load. In a case where the power consumption of the load is increased by an increase in the number of light emitting diodes 42, the threshold voltage Vth is increased. Inversely, in a case where the power consumption of the load is decreased by a decrease in the number of light emitting diodes 42, the threshold voltage Vth is decreased. Therefore, it is possible to easily adjust the rate of brightness adjustment and cope with the change in the load by updating the threshold voltage Vth.

In order to make the input current waveform and the input voltage waveform similar to each other, the threshold voltage Vth is variably set in proportion to the detection voltage of the input voltage from the terminal P1 of the control circuit 44. In order to prevent a change in the voltage across the smoothing condenser 39, i.e., a ripple at the smoothing condenser 39, the threshold voltage Vth is variably set according to a difference obtained by comparing a reference voltage with the voltage across the smoothing condenser 39 detected from a voltage at the terminal P3 of the control circuit 44.

Figure 5A:
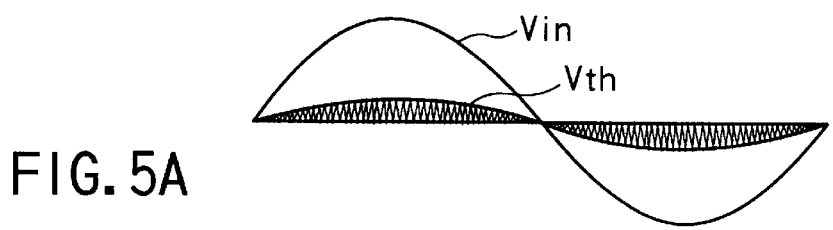
FIGS. 5A and 5B are waveform graphs showing a threshold voltage variably set with respect to an input detection voltage supplied to the control circuit shown in FIG. 1.
Figure 5B:
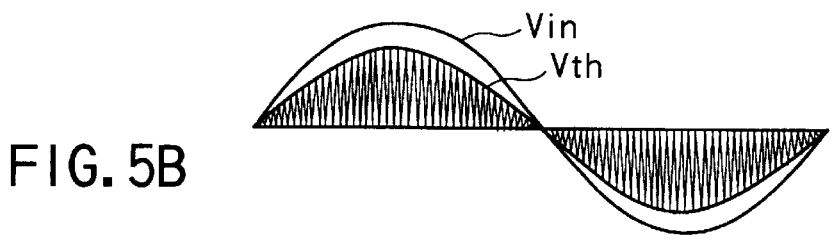

Accordingly, by variably setting the threshold voltage Vth in proportion to the input voltage and in proportion to the difference between the reference voltage and the voltage across the smoothing condenser 39, the waveform of the threshold voltage Vth can be made similar to the waveform of the input voltage. FIG. 5A shows voltage waveforms of a voltage Vin input to the terminal P1 and the threshold voltage Vth when the voltage input to the terminal P3 of the control circuit: 44 is high. FIG. 5B shows voltage waveforms of a voltage Vin input to the terminal P1 and the threshold voltage Vth when the voltage input to the terminal P3 of the control circuit 44 is low.

The current flowing in the choke coil 35 has a current waveform constituted by a series of triangles whose apices are assigned to the threshold voltage Vth. Since the current waveform is a triangular waveform, the average current is ½ of the peak current. Therefore, the threshold voltage Vth may be set to be twice higher than a desired input current.

Figure 6:
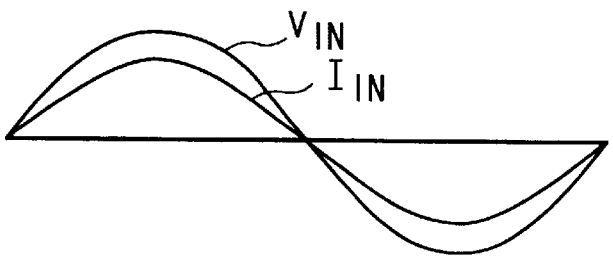
FIG. 6 is a waveform graph showing an input voltage and an input current of the light emitting diode lighting apparatus shown in FIG. 1.
Figure 7:
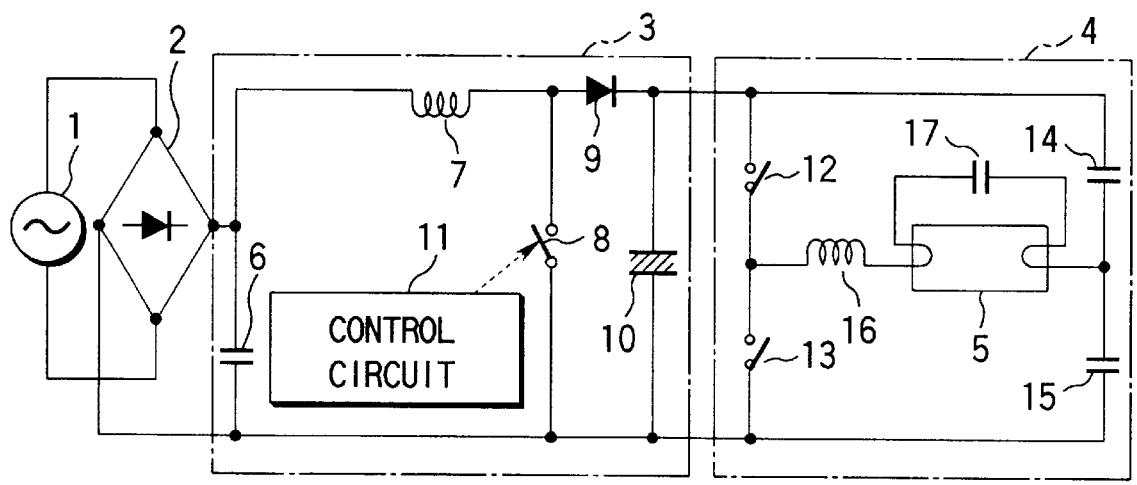
FIG. 7 is a circuit diagram showing the structure of a conventional fluorescent lighting apparatus.
Figure 8:
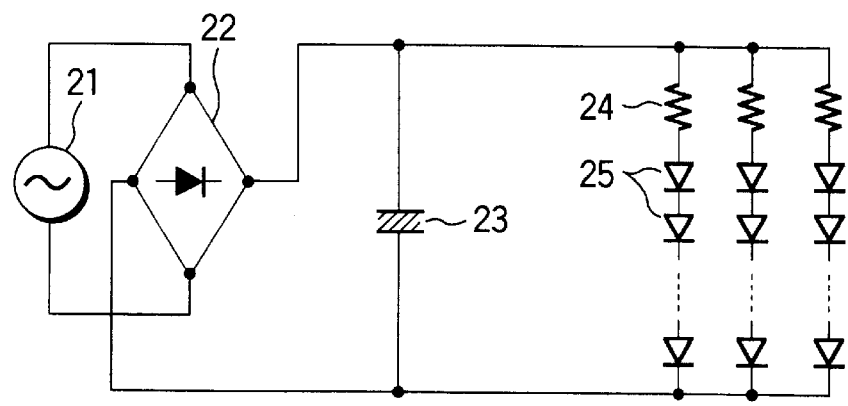
FIG. 8 is a circuit diagram showing the structure of another conventional light emitting diode lighting apparatus.

By making this control, a predetermined output for the light source unit 43 can be obtained, and the input current waveform Vin can be made to coincide with the input voltage waveform Iin, as shown in FIG. 6. Further, if the waveforms are thus equalized, the power factor becomes infinitely close to 100%. Since the input voltage is a sine wave having a commercially used frequency, the input current waveform is also a sine wave and does not include harmonic components. In addition, since adjustment of brightness of the light source unit, improvement of the power factor thereof, and reduction of the input current harmonics can be made by a control of switching of the MOSFET 36, the control can be simplified. Further, since the light emitting diodes 42 are lit by a direct current, a high-frequency inverter circuit is not required any more and it is possible to attain a simplified structure having a reduced number of components used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:
1. A lighting apparatus comprising:
   a full-wave rectifier circuit (32) electrically connected to an AC power source;
   a switch element connected in series with an inductor between output terminals of said full-wave rectifier circuit;
   a smoothing condenser connected in parallel to said switch element through a diode connected in series with said smoothing condenser;
   a light source unit connected in parallel with said smoothing condenser and including at least one series circuit of light emitting diodes connected such that a current flowing therethrough is not limited; and
   a control circuit which controls said switch element;
   wherein said control circuit includes a setting section for setting a threshold voltage, a current detecting port connected to detect a current flowing through said switch element, an input voltage detecting port connected to detect an input voltage to said smoothing condenser, and a condenser voltage detecting port connected to detect a voltage across said smoothing condenser, said control circuit being arranged such that the threshold voltage is variably set in proportion to the input voltage from said input voltage detecting port and is also variably set according to a difference obtained by comparing a reference voltage with the voltage from said condenser voltage detecting port to have a waveform similar to that of the input voltage, and such that said switch element is turned on to store magnetic energy in said inductor and is turned off on the basis of a relationship between the threshold voltage and a detection voltage from said current detection port to supply a current and store electric energy in said smoothing condenser, and a timing of turning on said switch element is determined on the basis of a decrease in the magnetic energy in said inductor, and such that the voltage across said smoothing condenser is set higher than a peak of the input voltage to said smoothing condenser and equal to a total sum of forward voltage drops of said light emitting diodes at a time of igniting of said light source unit.

2. A lighting apparatus according to claim 1, wherein said control circuit sets the voltage across said smoothing condenser to a voltage lower than a total sum of minimum forward voltage drops of said series-connected light emitting diodes at a time of extinguishing of said light source unit.

3. A lighting apparatus according to claim 1, wherein said control circuit sets the voltage across said smoothing condenser to a voltage higher than a total sum of minimum forward voltage drops of said series-connected light emitting diodes and lower than a total sum of maximum forward voltage drops of said series-connected light emitting diodes at a time of adjusting of brightness of said light source unit.

* * * * *